United States Patent
Satoh et al.

(10) Patent No.: US 10,206,272 B2
(45) Date of Patent: Feb. 12, 2019

(54) METHOD FOR MANUFACTURING TRACER-ENCAPSULATED SOLID PELLET FOR MAGNETIC-CONFINEMENT FUSION

(71) Applicant: HAMAMATSU PHOTONICS K.K., Hamamatsu-shi, Shizuoka (JP)

(72) Inventors: Nakahiro Satoh, Hamamatsu (JP); Ryo Yoshimura, Hamamatsu (JP); Masaru Takagi, Hamamatsu (JP); Toshiyuki Kawashima, Hamamatsu (JP); Hirofumi Kan, Shizuoka (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/323,115

(22) PCT Filed: May 15, 2015

(86) PCT No.: PCT/JP2015/064057
§ 371 (c)(1),
(2) Date: Dec. 30, 2016

(87) PCT Pub. No.: WO2016/002361
PCT Pub. Date: Jan. 7, 2016

(65) Prior Publication Data
US 2017/0171956 A1 Jun. 15, 2017

(30) Foreign Application Priority Data
Jul. 3, 2014 (JP) ................................. 2014-137681

(51) Int. Cl.
 *H05H 1/00* (2006.01)
 *G21B 1/05* (2006.01)
(Continued)

(52) U.S. Cl.
 CPC ............. *H05H 1/0018* (2013.01); *B01J 2/006* (2013.01); *B01J 2/06* (2013.01); *B01J 13/08* (2013.01);
(Continued)

(58) Field of Classification Search
None
See application file for complete search history.

(56) References Cited

U.S. PATENT DOCUMENTS

2001/0042932 A1* 11/2001 Mathiowitz .......... A61K 9/1641
264/4.1

FOREIGN PATENT DOCUMENTS

JP H07-325178 A 12/1995

OTHER PUBLICATIONS

International Preliminary Report on Patentability dated Jan. 12, 2017 for PCT/JP2015/064057.
(Continued)

*Primary Examiner* — Jeffrey D Washville
(74) *Attorney, Agent, or Firm* — Drinker Biddle & Reath LLP (57) ABSTRACT

The present invention relates to a method for manufacturing a tracer-encapsulated solid pellet for magnetic-confinement fusion, the method comprising a liquid droplet formation step of discharging an organic liquid containing an organic solvent into a stabilizing liquid to thereby form liquid droplets 12, and an organic solvent removal step of removing the organic solvent from the liquid droplets 12A. The organic liquid to be used is a liquid having a first organic polymer containing tracer atoms and a second organic polymer being an organic polymer different from the first organic polymer dissolved in the organic solvent, wherein the first organic polymer and the second organic polymer can be mutually phase-separated.

4 Claims, 5 Drawing Sheets

(51) Int. Cl.
  *B01J 13/18* (2006.01)
  *C08F 2/44* (2006.01)
  *B01J 13/08* (2006.01)
  *B01J 2/00* (2006.01)
  *B01J 2/06* (2006.01)

(52) U.S. Cl.
  CPC .............. *B01J 13/185* (2013.01); *C08F 2/44* (2013.01); *G21B 1/05* (2013.01); *H05H 1/00* (2013.01); *Y02E 30/126* (2013.01)

(56) References Cited

OTHER PUBLICATIONS

Shigeru Sudo et al., "Plasma Diagnostics with Tracer-Encapsulated Solid Pellet," Plasma and Fusion Research, Mar. 11, 2014, pp. 1402039-1-1402039-11, vol. 9.
S. Sudo, "Tracer-encapsulated cryogenic pellet production for particle transport diagnostics," Review of Scientific Instruments, Apr. 14, 1997, pp. 2717-2724, vol. 68, No. 7.
Shigeru Sudo et al., "Tracer-encapsulated solid pellet injection system," Review of Scientific Instruments, Jan. 13, 2012, pp. 023503-1-023503-6, vol. 83.
S. Sudo et al., "Tracer-encapsulated pellet injector for plasma diagnostics," Review of Scientific Instruments, Feb. 27, 2005, pp. 053507-1-053507-7, vol. 76.

\* cited by examiner

METHOD FOR MANUFACTURING TRACER-ENCAPSULATED SOLID PELLET FOR MAGNETIC-CONFINEMENT FUSION

TECHNICAL FIELD

The present invention relates to a method for manufacturing a tracer-encapsulated solid pellet for magnetic-confinement fusion.

BACKGROUND ART

Conventionally in the research on the magnetic-confinement fusion, in order to observe the state of core plasma, shooting pellets containing a tracer material into a flow of plasma is carried out.

The pellets consist of a spherical central part containing the tracer material and an outer layer covering its circumference. When the pellets are shot into the plasma, the pellets move to the center of the flow of plasma while the outer layer is being peeled off by the energy of the plasma. When the outer layer is peeled off and the central part is exposed, since the tracer substance emits light by the energy of the plasma, by tracing the light emission, the information on the flow and the like of the plasma can be acquired.

Such pellets are manufactured conventionally by making a hole on a sphere constituted of a resin or the like, filling the sphere with a tracer material separately weighed, and refilling in the hole (for example, see Non Patent Literature 1).

CITATION LIST

Non Patent Literature

Non Patent Literature 1: Shigeru SUDO et al., "Plasma Diagnostic with Tracer-Encupsulated Solid Pellet", Science and Nuclear Fusion Research, Japan, 2014, Volume 9, 1402039

SUMMARY OF INVENTION

Technical Problem

However, the above manufacturing method, since needing to one by one carry out the hole making on the pellet and the filling of the tracer material, is not suitable for mass production. Further, the uniformity of the amount of the tracer material to be filled is difficult to control.

Then, the present invention has an object to provide a method for manufacturing a tracer-encapsulated solid pellet for magnetic-confinement fusion, the method being suitable for mass production and being capable of easily encapsulating a predetermined amount of a tracer material.

Solution to Problem

The present invention provides a method for manufacturing a tracer-encapsulated solid pellet for magnetic-confinement fusion, the method comprising a liquid droplet formation step of discharging an organic liquid containing an organic solvent into a stabilizing liquid to thereby form liquid droplets, and an organic solvent removal step of removing the organic solvent from the liquid droplets, wherein the organic liquid is a liquid in which a first organic polymer containing tracer atoms and a second organic polymer being an organic polymer different from the first organic polymer are dissolved in the organic solvent, and the first organic polymer and the second organic polymer can be mutually phase-separated.

In this manufacturing method, when the organic liquid is discharged into the stabilizing liquid, liquid droplets of the organic liquid are formed in the stabilizing liquid. Then, the first organic polymer and the second organic polymer dissolved in the organic liquid cause phase-separation; and such a constitution is made that the first organic polymer containing tracer atoms makes a sphere, and the second organic polymer covers the circumference of the sphere (being self-layered). Thereafter, the organic solvent is removed to thereby complete a tracer-encapsulated solid pellet for magnetic-confinement fusion. In this process, since the discharge amount of the organic liquid is easily controlled and the first organic polymer containing tracer atoms easily forms a sphere in a stabilizing liquid, according to the manufacturing method according to the present invention, a predetermined amount of a tracer material can easily be encapsulated in the second organic polymer. Further the manufacturing method according to the present invention, since being capable of continuously forming liquid droplets by continuously discharging the organic liquid into the stabilizing liquid, is suitable for mass production of the tracer-encapsulated solid pellet for magnetic-confinement fusion.

The above manufacturing method may be configured such that: the organic liquid has a first organic liquid and a second organic liquid which are separately prepared; the first organic liquid contains the first organic polymer, and the second organic liquid contains the second organic polymer; and in the liquid droplet formation step, by using a combined nozzle equipped with a first nozzle and a second nozzle having a discharge port surrounding a discharge port of the first nozzle, the first organic liquid and the second organic liquid are simultaneously discharged from the first nozzle and the second nozzle, respectively. In this case, since the first organic polymer and the second organic polymer are discharged from the separate nozzles, mixing when the first organic polymer and the second organic polymer are discharged into the stabilizing liquid is suppressed low, and the phase separation thereafter becomes easy. Further with respect to portions not having been mixed when discharged, no mixing thereafter is caused and the phase separation state is easily maintained.

The present invention further provides a method for manufacturing a tracer-encapsulated solid pellet for magnetic-confinement fusion, the method comprising a liquid droplet formation step of discharging an organic liquid into a stabilizing liquid to thereby form liquid droplets, wherein the organic liquid is a liquid containing a first raw material monomer corresponding to a first organic polymer containing tracer atoms, a first polymerization initiator to initiate the first raw material monomer, and a second organic polymer being an organic polymer different from the first organic polymer; and the first organic polymer made by polymerization of the first raw material monomer and the second organic polymer can be mutually phase-separated.

In this manufacturing method, what corresponds to the first organic polymer in the former manufacturing method is in the state of being the raw material monomer, and the organic liquid is constituted by dissolving the polymerization initiator and the second organic polymer in the monomer. In this manufacturing method, when the organic liquid are discharged into the stabilizing liquid, polymerization of the first raw material monomer in the organic liquid is initiated and the first organic polymer is synthesized. Then, the first organic polymer and the second organic polymer cause phase separation to thereby form the target liquid droplets.

This manufacturing method may be configured such that the organic liquid contains an organic solvent and the method further comprises an organic solvent removal step of removing the organic solvent from the liquid droplets. When the organic liquid contains an organic solvent, it is advantageous in the case where the solubility of the second organic polymer to the first raw material monomer is poor, in the case where the viscosity of the organic liquid is intended to be regulated, and in other cases.

This manufacturing method may be configured such that: the organic liquid has a first organic liquid and a second organic liquid which are prepared separately from each other; the first organic liquid contains the first raw material monomer and the first polymerization initiator, and the second organic liquid contains the organic solvent and the second organic polymer dissolved in the organic solvent; and in the liquid droplet formation step, by using a combined nozzle equipped with a first nozzle and a second nozzle having a discharge port surrounding a discharge port of the first nozzle, the first organic liquid and the second organic liquid are simultaneously discharged from the first nozzle and the second nozzle, respectively.

The present invention further provides a method for manufacturing a tracer-encapsulated solid pellet for magnetic-confinement fusion, the method comprising: a liquid droplet formation step of discharging an organic liquid into a stabilizing liquid to thereby form liquid droplets, wherein the organic liquid is a liquid containing a first organic polymer containing tracer atoms, a second raw material monomer corresponding to a second organic polymer different from the first organic polymer, and a second polymerization initiator to initiate polymerization of the second raw material monomer; and the first organic polymer and the second organic polymer made by polymerization of the second raw material monomer can be mutually phase-separated.

In this manufacturing method, what corresponds to the second organic polymer in the above manufacturing method is in the state of being the raw material monomer, and the organic liquid is constituted by dissolving the polymerization initiator and the first organic polymer in the monomer. In the manufacturing method, when the organic liquid are discharged into the stabilizing liquid, the second raw material monomer in the organic liquid initiates polymerization and the second organic polymer is synthesized. Then, the first organic polymer and the second organic polymer cause phase separation to thereby form the target liquid droplets.

Also in this manufacturing method, the organic liquid contains an organic solvent; and the manufacturing method may be configured by further comprising an organic solvent removal step of removing the organic solvent from the liquid droplets.

Further this manufacturing method may also be configured such that: the organic liquid has a first organic liquid and a second organic liquid which are prepared separately from each other; the first organic liquid contains the organic solvent and the first organic polymer dissolved in the organic solvent, and the second organic liquid contains the second raw material monomer and the second polymerization initiator; and in the liquid droplet formation step, by using a combined nozzle equipped with a first nozzle and a second nozzle having a discharge port surrounding a discharge port of the first nozzle, the first organic liquid and the second organic liquid are simultaneously discharged from the first nozzle and the second nozzle, respectively.

The present invention further provides a method for manufacturing a tracer-encapsulated solid pellet for magnetic-confinement fusion, the method comprising: a liquid droplet formation step of discharging an organic liquid into a stabilizing liquid to thereby form liquid droplets, wherein the organic liquid is a liquid containing a first raw material monomer corresponding to a first organic polymer containing tracer atoms, a second raw material monomer corresponding to a second organic polymer different from the first organic polymer, a first polymerization initiator to initiate polymerization of the first raw material monomer, and a second polymerization initiator to initiate polymerization of the second raw material monomer; and the first organic polymer made by polymerization of the first raw material monomer and the second organic polymer made by polymerization of the second raw material monomer can be mutually phase-separated.

In this manufacturing method, two kinds of the raw material monomers are discharged into the stabilizing liquid. In this manufacturing method, when the organic liquid is discharged into the stabilizing liquid, the first raw material monomer and the second raw material monomer in the organic liquid each initiate polymerization to thereby synthesize the first organic polymer and the second organic polymer. Then, the first organic polymer and the second organic polymer cause the phase-separation to thereby form the target liquid droplets.

This manufacturing method may also be configured such that: the organic liquid contains an organic solvent; and the method further comprises an organic solvent removal step of removing the organic solvent from the liquid droplets.

Further this manufacturing method may also be configured such that: the organic liquid has a first organic liquid and a second organic liquid which are prepared separately from each other; the first organic liquid contains the first raw material monomer and the first polymerization initiator, and the second organic liquid contains the second raw material monomer and the second polymerization initiator; and in the liquid droplet formation step, by using a combined nozzle equipped with a first nozzle and a second nozzle having a discharge port surrounding a discharge port of the first nozzle, the first organic liquid and the second organic liquid are simultaneously discharged from the first nozzle and the second nozzle, respectively.

In the above any manufacturing method, it is preferable that the first organic polymer containing tracer atoms be a polymer selected from polymers belonging to the polymer group consisting of organic polymers having metal atoms or semimetal atoms bonded thereto, organic polymers having halogen atoms bonded thereto and organic polymers having a tracer substance dispersed therein. By the self-layering and phase-separation of the first organic polymer containing tracer atoms and the second organic polymer, there can be manufactured a two-layered tracer-encapsulated solid pellet for magnetic-confinement fusion or a two-layered pellet containing deuterium being a fuel.

In addition, it is preferable that the organic polymers be hydrocarbon-based polymers.

Advantageous Effects of Invention

According to the present invention, there can be provided a method for manufacturing a tracer-encapsulated solid pellet for magnetic-confinement fusion, the method being suitable for mass production, and being capable of easily encapsulating a predetermined amount of a tracer material.

DESCRIPTION OF EMBODIMENTS

Hereinafter, the preferred embodiments according to the present invention will be described in detail by reference to the drawings. Here, in the drawings, the same reference sign is given to the same part or a corresponding part, and duplicate descriptions will be omitted.

<Tracer-Encapsulated Solid Pellet for Magnetic-Confinement Fusion>

Figure 1:
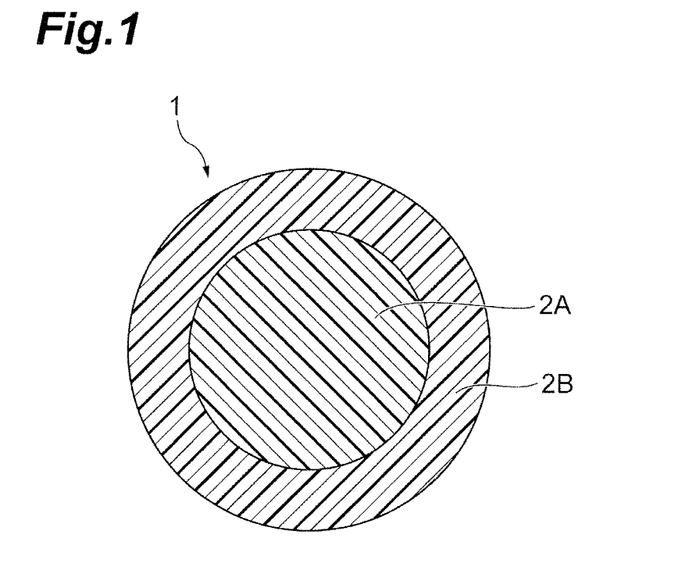
FIG. 1 is a cross-sectional view of a tracer-encapsulated solid pellet for magnetic-confinement fusion manufactured by a manufacturing method according to the present embodiment.

A tracer-encapsulated solid pellet for magnetic-confinement fusion manufactured by the manufacturing method according to the present embodiment will be described. The tracer-encapsulated solid pellet for magnetic-confinement fusion is a solid sphere to measure the state of plasma in a reactor core, and consists of organic polymers organically synthesized. As illustrated in FIG. 1, a tracer-encapsulated solid pellet 1 for magnetic-confinement fusion consists of two layers of an inner layer 2A making a solid sphere, and an outer layer 2B covering the outer surface of the inner layer 2A. It is preferable that the diameter of the whole body be about 0.1 mm to 10 mm; and about 0.2 mm to 5 mm is more preferable. It is preferable that the thickness of the outer layer 2B be about 30 μm to 200 μm.

The inner layer 2A is constituted of a first organic polymer, and the outer layer 2B is constituted of a second organic polymer.

The first organic polymer is an organic polymer containing tracer atoms; and it is preferable that a raw material in the manufacturing process of the tracer-encapsulated solid pellet 1 for magnetic-confinement fusion be, for example, a polymer selected from polymers belonging to the polymer group consisting of organic polymers having metal atoms or semimetal atoms bonded thereto, organic polymers having halogen atoms bonded thereto and organic polymers having a tracer substance dispersed therein. it is preferable that these organic polymers be organic polymers not containing nitrogen or oxygen atoms.

Examples of the basic skeleton moiety of the above organic polymer include hydrocarbon-based polymers and vinyl-based polymers, and specific examples thereof include polyethylene, polypropylene, polystyrene-based resins, ABS resins, polyacetal, polycarbonate, and hydrocarbon-based resins not containing oxygen atoms.

The "organic polymer having metal atoms or semimetal atoms bonded thereto" refers to, for example, a polymer in which metal atoms or semimetal atoms such as Sn, Si, Ge, V, Cu, Mn or Pb are bonded to a vinyl-based polymer listed as the above "organic polymer".

The "organic polymer having halogen atoms bonded thereto" refers to, for example, a polymer in which fluorine atoms, chlorine atoms, bromine atoms or iodine atoms are bonded to a polymer listed as the above "organic polymer", and specifically includes poly-p-chlorostyrene and poly-2, 5-dichlorostyrene.

The "organic polymer having a tracer substance dispersed therein" refers to a polymer in which the tracer substance is dispersed in a resin listed as the above "organic polymer". Examples of the tracer substance include deuterated organic polymers, and microparticles containing deuterides or metal atoms. By dispersing the tracer substance in the organic polymer, even if the tracer substance is one difficult to chemically bond to the organic polymer, the tracer substance can be introduced in the inner layer 2A.

The second organic polymer is a polymer different from the first organic polymer, and the polymer not containing the tracer atoms is preferable. Examples of the second organic polymer include the polymers exemplified as the basic skeleton moiety of the above first polymer. The exemplified polymers are preferable also because it becomes easy for the outer layer 2B to be formed by the phase-separation described later, particularly by controlling the density by dissolving the first organic polymer in an organic solvent such as benzene or toluene.

The above "organic polymer" refers to a polymer which can be artificially synthesized from a corresponding raw material monomer. Among the organic polymers, synthetic resins are preferable.

In any case of using the above any polymer, as the "organic polymer" constituting the main skeleton, a hydrocarbon-based polymer is preferable. As the hydrocarbon-based polymer, an organic polymer consists only of carbon atoms and hydrogen atoms is more preferable.

It is preferable that the molecular weight of the organic polymer (moiety excluding the above metal atoms or semimetal atoms and halogen atoms) be 10000 to 500000; and 100000 to 400000 is more preferable.

<Manufacturing Apparatus>

Figure 2:
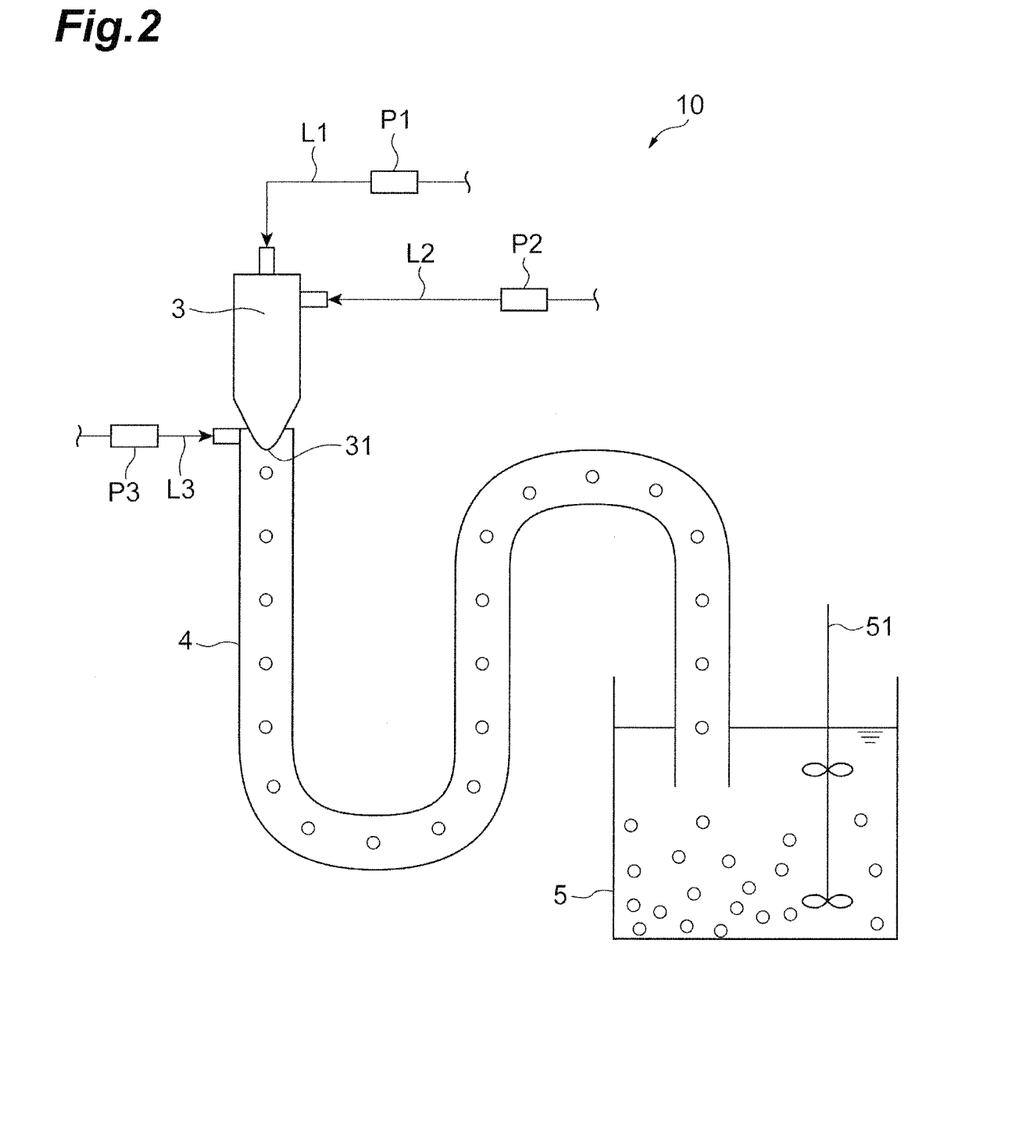
FIG. 2 is a schematic constitutional diagram of a manufacturing apparatus to carry out a manufacturing method according to the present embodiment.

Then, a manufacturing apparatus for manufacturing the tracer-encapsulated solid pellet 1 for magnetic-confinement fusion will be described. As illustrated in FIG. 2, an apparatus for manufacturing the tracer-encapsulated solid pellet for magnetic-confinement fusion (hereinafter, referred to simply as "manufacturing apparatus") 10 is equipped with a combined nozzle 3 to discharge liquids, lines L1 and L2 and pumps P1 and P2 to supply respective supply liquids to the combined nozzle 3, a tube 4 one end of which is attached to a discharge port 31 of the combined nozzle 3, a line L3 and a pump P3 to supply a stabilizing liquid to the one end side of the tube 4, and a water tank 5 into which the other end of the tube 4 is guided. Here, respective liquid reservoirs present in the preceding stage of the pumps P1 to P3 are omitted in the presentation on the drawing.

Figure 3:
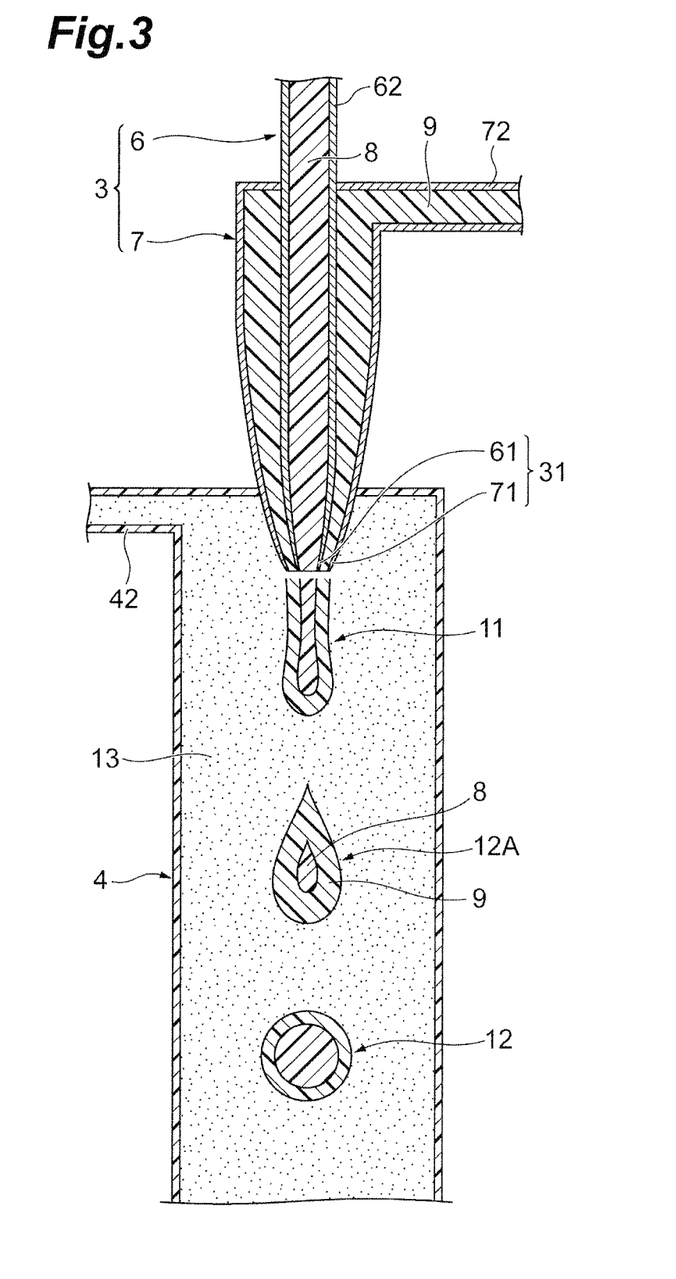
FIG. 3 is a partially enlarged cross-sectional view of FIG. 2.

FIG. 3 is a partially enlarged cross-sectional diagram of the combined nozzle 3 and one end side of the tube 4. The combined nozzle 3 is equipped with a first nozzle 6 extending rectilinearly and having a nearly cylindrical shape, and a second nozzle 7 having a nearly cylindrical shape which has a discharge port surrounding a discharge port 61 of the first nozzle 6, and has a trunk part surrounding a trunk part of the first nozzle 6.

The first nozzle 6 and the second nozzle 7 both have a tapered shape, and the discharge ports 61 and 71 being their front ends are located in concentric circles configuration where their diameters increase in this order. The inner diameters of the discharge ports 61 and 71 are those under consideration of the size of the tracer-encapsulated solid pellet 1 for magnetic-confinement fusion, and the layer thicknesses of the inner layer 2A and the outer layer 2B. It is preferable that the inner diameters be 50 µm to 2100 µm and 70 µm to 2200 µm, respectively.

On the opposite sides to the discharge ports 61 and 71 of the first nozzle 6 and the second nozzle 7, supply ports 62 and 72 being reception ports of the supply liquids are provided, respectively. The lines L1 and L2 are connected, respectively, to the supply ports 62 and 72; and the pumps P1 and P2 to transport respective supply liquids (not shown in figure) to the combined nozzle 3 are provided to the lines L1 and L2 (see FIG. 2).

One end of the tube 4 is attached to the discharge port 31 of the combined nozzle 3 so as to cover the discharge port 31. A supply port 42 to make a stabilizing liquid to flow in the tube 4 is provided to the one end side of the tube 4. A line L3 is connected to the supply port 42; and a pump P3 to transport the stabilizing liquid to the tube 4 is provided to the line L3 (see FIG. 2).

The other end of the tube 4 is guided into the water tank 5. The water tank 5 has a stirring blade 51 to stir the stabilizing liquid stored in the tank 5.

<Manufacturing Method>

Then, a method, using the manufacturing apparatus 10, for manufacturing the tracer-encapsulated solid pellet 1 for magnetic-confinement fusion will be described.

(Manufacturing Procedure)

First, an organic liquid in which a first organic polymer and a second organic polymer are dissolved is prepared. In the selection of the first organic polymer and the second organic polymer, these are selected so that when these are mixed, or when these are dissolved and mixed in an organic solvent, these are organic polymers phase-separating from each other. After the selection, a first organic liquid 8 in which the first organic polymer is dissolved in an organic solvent is prepared, and a second organic liquid 9 in which the second organic polymer is dissolved in an organic solvent is prepared.

Here, as the organic solvent, an organic solvent which can dissolve the first organic polymer and the second organic polymer is used. The organic solvent to be used to dissolve the first organic polymer and the organic solvent to be used to dissolve the second organic polymer may be the same or may be different from each other. As the organic solvent, for example, aromatic hydrocarbons are preferable; and among these, fluorobenzene is preferable from the viewpoint of being good in the volatility in water. Further the uniformity of the thickness of the each layer is improved by carrying out the density control by adding benzene, toluene or the like to the first organic polymer solution and the second organic polymer solution.

It is preferable that the concentrations of the organic polymers in the first organic liquid 9A and the second organic liquid 9B be each made to be 1% by weight/volume to 30% by weight/volume, though depending on the solubility and the solution viscosity The first organic liquid 8 and the second organic liquid 9 are set in respective liquid reservoirs (not shown in figure) so that the first organic liquid 8 can be supplied from the pump P1 through the line L 1 to the first nozzle 6; and the second organic liquid 9 can be supplied from the pump P2 through the line L2 to the second nozzle 7. Further by driving the pump P3, the stabilizing liquid 13 is made to flow at a constant speed through the line L3 and from one end side of the tube 4 to thereby fill the interior of the tube 4 with the stabilizing liquid 13. The stabilizing liquid 13 discharged from the other end of the tube 4 is received by the water tank 5 with the stirring blade 51 being driven.

The stabilizing liquid 13 to be made to flow in the tube 4 is a liquid to stabilize liquid droplets discharged from the combined nozzle 3; and an aqueous solvent having a low compatibility with the organic liquids constituting the liquid droplets is preferable, and particularly water is preferable. Here, "stabilizing" refers to that the sphericity of the liquid droplets and the spherical symmetry of the phase-separated each layer are secured. The stabilizing liquid 13 may have a stabilizing agent added thereto. The stabilizing agent includes an organic acids and a polyacrylic acid having a molecular weight of 1000000; and a polyacrylic acid aqueous solution having the polyacrylic acid dissolved therein and having a concentration thereof of 0.025 to 0.075% by weight, particularly 0.05% by weight, can be used as the stabilizing liquid 13. Further it is preferable from the viewpoint of suppressing convection of the stabilizing liquid 13 that the temperature of the stabilizing liquid 13 be 20° C. to 50° C.; and 20° C. to 25° C. is more preferable.

The combined nozzle 3 is installed so that the discharge port 31 is directed downward in the vertical direction. By driving the pumps P1 and P2, the liquids are simultaneously discharged from the nozzles through the lines L1 and L2, respectively. That is, the first organic liquid 8 and the second organic liquid 9 are discharged from the discharge port 61 of the first nozzle 6 and the discharge port 71 of the second nozzle 7, respectively, into the stabilizing liquid 13 flowing in the tube 4. It is preferable that the flow volume discharged be 0.5 mL/h to 200 mL/h. At this time, the flow volume is suitably established according to the target size of the tracer-encapsulated solid pellet 1 for magnetic-confinement fusion to be manufactured, the thickness of the each layer, and the concentrations of the organic polymers.

The discharged liquids form a jet 11 extending downward by the gravity and the flow of the stabilizing liquid 13 in the tube 4, and the front end of the jet 11 is soon torn off to thereby form a liquid droplet 12 (liquid droplet formation step). This liquid droplet 12A is configured such that the first organic liquid 8 discharged from the first nozzle 6 is covered with the second organic liquid 9 (so-called "$O_1/O_2$/W-type emulsion").

Here, the liquid droplet 12A is in the state that parts of the divisions of the first organic liquid 8 and the second organic liquid 9 are mutually mixed, and the other parts thereof are not mixed. Since the first organic polymer and the second organic polymer have been selected so as to be polymers mutually phase-separating in the state of being dissolved in an organic solvent, the portion where the parts of the first organic liquid 8 and the second organic liquid 9 are mutually mixed is gradually phase-separated in such a manner that the first organic polymer moves inward and the second organic polymer moves outward (being self-layered, the liquid droplet 12 in FIG. 3). Further the other parts not having been mixed in the discharge cause no mixing thereafter, making easy the maintenance of the phase-separation state.

Here, by regulating the flow volume to be discharged from the each nozzle and the concentrations of the organic polymers in the above ranges, the size of the liquid droplet 12 and the width (thickness) of the each layer can suitably be regulated.

The liquid droplet 12 after being phase-separated is carried on the flow of the stabilizing liquid 13 and moves in the tube 4, and soon discharged from the other end of the tube 4 and stored in the water tank 5. In the water tank 5, while the liquid droplet 12 runs around in the water tank 5 by stirring by the stirring blade 51, the organic solvent is leached out and removed from the layers consisting of the first organic liquid 8 and the second organic liquid 9 into the stabilizing liquid 13 (organic solvent removal step). Simultaneously when the organic solvent is removed, the first polymer and the second polymer are cured (solidified), whereby the portion to become the inner layer 2A and the outer layer 2B of the tracer-encapsulated solid pellet 1 for magnetic-confinement fusion is constituted.

After the organic solvent is removed, the sphere is taken out from the water tank 5. Here, in the case of using a material other than water as the stabilizing liquid 13 made to flow in the tube 4, and in the case of adding a stabilizing agent to the stabilizing liquid 13, it is preferable that the sphere be cleaned with pure water.

By the above procedure, the tracer-encapsulated solid pellet 1 for magnetic-confinement fusion can be manufactured.

The above manufacturing method makes such a constitution that the first organic polymer containing tracer atoms makes a sphere, and the second organic polymer covers the peripheral of the sphere, in the stabilizing liquid 13. Then, the discharge amounts of the organic liquids 8 and 9 from the first and second nozzles 6 and 7 are easily controlled. Therefore, according to the manufacturing method, a predetermined amount of the tracer material can easily be encapsulated in the second organic polymer.

Further, this manufacturing method, since being capable of continuously forming the liquid droplets 12A and 12 by continuously discharging the organic liquids 8 and 9 from the first and second nozzles 6 and 7, is suitable for mass production of the tracer-encapsulated solid pellet 1 for magnetic-confinement fusion.

(Aspect Using Other Organic Liquids)

As substitutes for the above organic liquids, the following organic liquids may be used. That is, at least one of the first organic liquid 8 and the second organic liquid 9 to be prepared as the organic liquids may be prepared as a corresponding monomer and polymerization initiator. For example, in place of the first organic polymer, there can be used a first raw material monomer corresponding thereto and a first polymerization initiator to initiate polymerization of the first raw material monomer. In this case, it is preferable that the first raw material monomer be a liquid, and the first raw material monomer can serve also as a solvent to dissolve the polymerization initiator. In the case where the solubility of the polymerization initiator to the monomer is poor, and in the case where the viscosity of the organic liquid is intended to be decreased, it is preferable that an organic solvent be used.

Further, in place of the first organic polymer, there may be used a first raw material monomer corresponding thereto and a first polymerization initiator, and in place of the second organic polymer, there may be used a second raw material monomer corresponding thereto and a second polymerization initiator. Also in this case, it is preferable that the each raw material monomer be a liquid, and the each raw material monomer can serve also as a solvent to dissolve the corresponding polymerization initiator. Further also in this case, organic solvents may suitably be used.

As the polymerization initiators, there can be used well-known ones to react by light or heat, and the polymerization initiators include radical polymerization initiators, anionic polymerization initiators and cationic polymerization initiators.

In the case of using the raw material monomer and the polymerization initiator as the organic liquid, by applying light or heat on the jet 11 or the liquid droplets 12 in one place from the vicinity of the discharge port 31 of the combined nozzle 3 to the first half part of the tube 4, the polymerization of the raw material monomers is initiated (polymerization initiation step). After the first organic liquid and the second organic liquid are discharged into the stabilizing liquid 13, the liquid droplets maintaining the phase-separation state are formed and move in the tube 4. When light or heat is applied on the liquid droplets, the polymerization of the raw material monomers is initiated and the raw material monomers are cured to make the organic polymers. In the case where no organic solvent is used for either of the first organic liquid and the second organic liquid, the above organic solvent removal step is unnecessary.

(Manufacturing Example)

One example of manufacturing by the above procedure will be described, and is as follows.

The inner diameter of a discharge port of a first nozzle . . . 150 μm

The inner diameter of a discharge port of a second nozzle . . . 320 μm

The inner diameter of a tube . . . 2.2 mm

A first organic liquid discharged from the first nozzle . . . a fluorobenzene solution of poly-p-chlorostyrene (concentration: 18%)

A second organic liquid discharged from the second nozzle . . . a fluorobenzene solution of polystyrene (concentration: 18%)

A stabilizing liquid made to flow in the tube . . . an aqueous solution of polyacrylic acid (concentration: 0.05%)

The flow volume discharged from the first nozzle . . . 3 mL/h

The flow volume discharged from the second nozzle . . . 4.5 mL/h

The flow volume of the stabilizing liquid made to flow in the tube . . . 12 mL/min The temperature of the stabilizing liquid made to flow in the tube . . . room temperature °C.

When manufacture was actually carried out under this condition according to the above manufacturing procedure, there was obtained a tracer-encapsulated solid pellet for magnetic-confinement fusion having an inner layer of 420 μm and an outer layer of 614 μm.

<Manufacturing Method Using Another Manufacturing Apparatus>

Although in the above manufacturing method, there is shown the case of using the manufacturing apparatus 10 having the combined nozzle 3 having a double-pipe structure, there may be used a manufacturing apparatus having a combined nozzle having a single-pipe structure. That is, there may be used a manufacturing apparatus not being equipped with the second nozzle 7. Hereinafter, this will be described.

Figure 4:
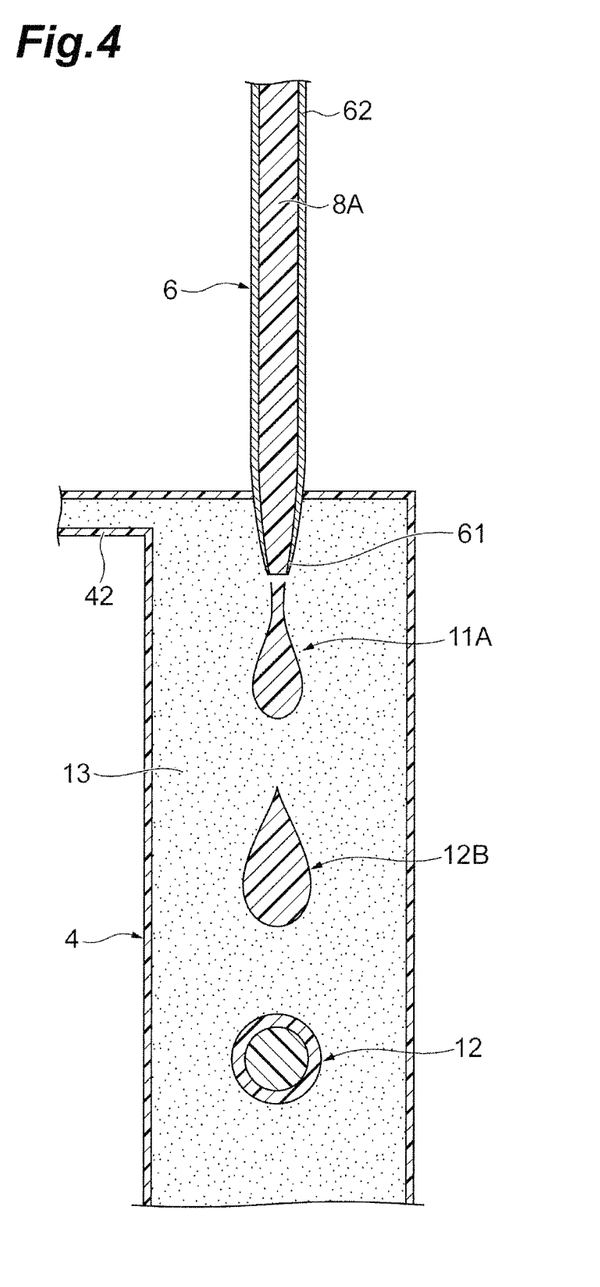
FIG. 4 is a partially enlarged cross-sectional view of a manufacturing apparatus to carry out a manufacturing method according to another embodiment.

As illustrated in FIG. 4, the different point of a nozzle 6 having a single-pipe structure from the combined nozzle 3 having a double-pipe structure is the point that the manufacturing apparatus is not equipped with the second nozzle 7, and an organic liquid 8A is supplied from one supply port 62 and discharged from one discharge port 61.

Further also the organic liquid 8A discharged from the nozzle 6 is not divided to a first organic liquid and a second organic liquid, and supplied as a liquid of one kind to the nozzle 6. The organic liquid 8A is prepared by dissolving a first organic polymer and a second organic polymer in an organic solvent. The selection of the organic polymers is the same as in the above embodiment.

When the organic liquid 8A is discharged from the nozzle 6, these form a jet 11A extending downward by the gravity and the flow of a stabilizing liquid 13 in a tube 4, and the front end of the jet 11A is soon torn off to thereby form a liquid droplet 12B (so-called "O/W-type emulsion") (liquid droplet formation step).

Here, while the liquid droplet 12B moves in the tube 4, the liquid droplet 12B gradually causes phase separation and changes from the state of being the layer having no division to the state (state indicated by reference sign 12) of being separated into two layers (being self-layered). An organic solvent removal step thereafter are carried out similarly to the above embodiment.

According to this manufacturing apparatus and this manufacturing method, a tracer-encapsulated solid pellet 1 for magnetic-confinement fusion can be manufactured by using the simplified nozzle 6.

Here, also in this embodiment, in place of the first organic polymer in the organic liquid 8A, there can be used a first raw material monomer corresponding to the first organic polymer and a first polymerization initiator, and in place of the second organic polymer, there can be used a second raw material monomer corresponding to the second organic polymer and a second polymerization initiator. The use/non-use of an organic solvent can also suitably be selected.

Hitherto, the preferred embodiments according to the present invention have been described, but the present invention is not any more limited to the above embodiments. Although in any of the above embodiments, there have been shown examples in which the tracer-encapsulated solid pellet 1 for magnetic-confinement fusion consists of two layers of the inner layer 2A and the outer layer 2B, according to the present invention, there can also be manufactured, for example, a tracer-encapsulated solid pellet 1 for magnetic-confinement fusion consisting of three or more layers.

Figure 5:
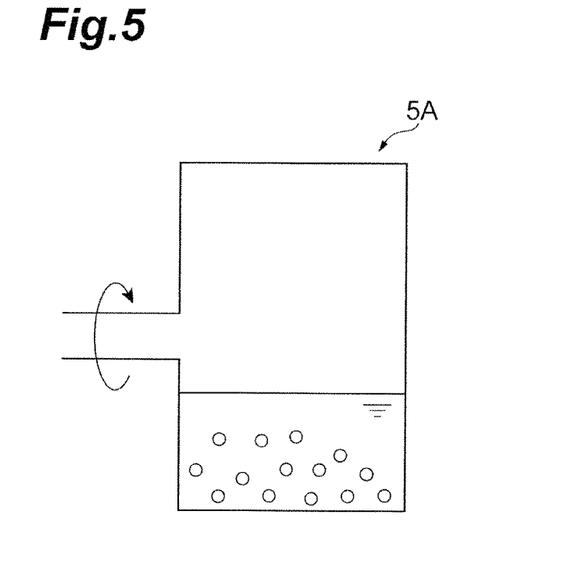
FIG. 5 is a view illustrating another example of a water tank.

Further in place of the water tank 5 used in the above embodiments, a water tank 5A having a narrow inlet port and a cylindrical body part can be also used as illustrated in FIG. 5. In this case, instead of using the stirring blade, the liquid droplets 12 in the interior can be stirred by inclining the water tank 5A so that the axial line of the cylinder becomes nearly horizontal and rotating (see the arrow in figure) the water tank 5A with the horizontal direction being the rotational axial line (organic solvent removal step).

REFERENCE SIGNS LIST

1 . . . TRACER-ENCAPSULATED SOLID PELLET FOR MAGNETIC-CONFINEMENT FUSION, 3 . . . COMBINED NOZZLE, 6 . . . FIRST NOZZLE, 7 . . . SECOND NOZZLE, 8 . . . FIRST ORGANIC LIQUID, 8A . . . ORGANIC LIQUID, 9 . . . SECOND ORGANIC LIQUID, 12, 12A, 12B . . . LIQUID DROPLET, 13 . . . STABILIZING LIQUID, and 31, 61, 71. . . DISCHARGE PORT

The invention claimed is:

1. A method for manufacturing a tracer-encapsulated solid pellet for magnetic-confinement fusion, the method comprising:
a liquid droplet formation step of discharging an organic liquid comprising an organic solvent into a stabilizing liquid to thereby form a liquid droplet; and
an organic solvent removal step of removing the organic solvent from the liquid droplet,
wherein the organic liquid is a liquid having a first organic polymer comprising a tracer atom and a second organic polymer being an organic polymer different from the first organic polymer dissolved in the organic solvent;
the first organic polymer and the second organic polymer can be mutually phase-separated;
the organic liquid has a first organic liquid and a second organic liquid prepared separately from each other;
the first organic liquid comprises the first organic polymer;
the second organic liquid comprises the second organic polymer; and
in the liquid droplet formation step, by using a combined nozzle equipped with a first nozzle and a second nozzle having a discharge port surrounding a discharge port of the first nozzle, the first organic liquid and the second organic liquid are discharged simultaneously from the first nozzle and the second nozzle, respectively.

2. A method for manufacturing a tracer-encapsulated solid pellet for magnetic-confinement fusion, the method comprising:
a liquid droplet formation step of discharging an organic liquid comprising an organic solvent into a stabilizing liquid to thereby form a liquid droplet; and
an organic solvent removal step of removing the organic solvent from the liquid droplet,
wherein the organic liquid is a liquid having a first organic polymer comprising a tracer atom and a second organic polymer being an organic polymer different from the first organic polymer dissolved in the organic solvent;
the first organic polymer and the second organic polymer can be mutually phase-separated; and
the first organic polymer comprising a tracer atom is a polymer selected from polymers belonging to the polymer group consisting of organic polymers having metal atoms or semimetal atoms bonded thereto, organic polymers having halogen atoms bonded thereto and organic polymers having a tracer substance dispersed therein.

3. The method for manufacturing a tracer-encapsulated solid pellet for magnetic-confinement fusion according to claim 1, wherein at least one of the first organic polymer and the second organic polymer is a hydrocarbon-based polymer.

4. The method for manufacturing a tracer-encapsulated solid pellet for magnetic-confinement fusion according to claim 2, wherein at least one of the first organic polymer and the second organic polymer is a hydrocarbon-based polymer.

* * * * *